Patented Feb. 29, 1944

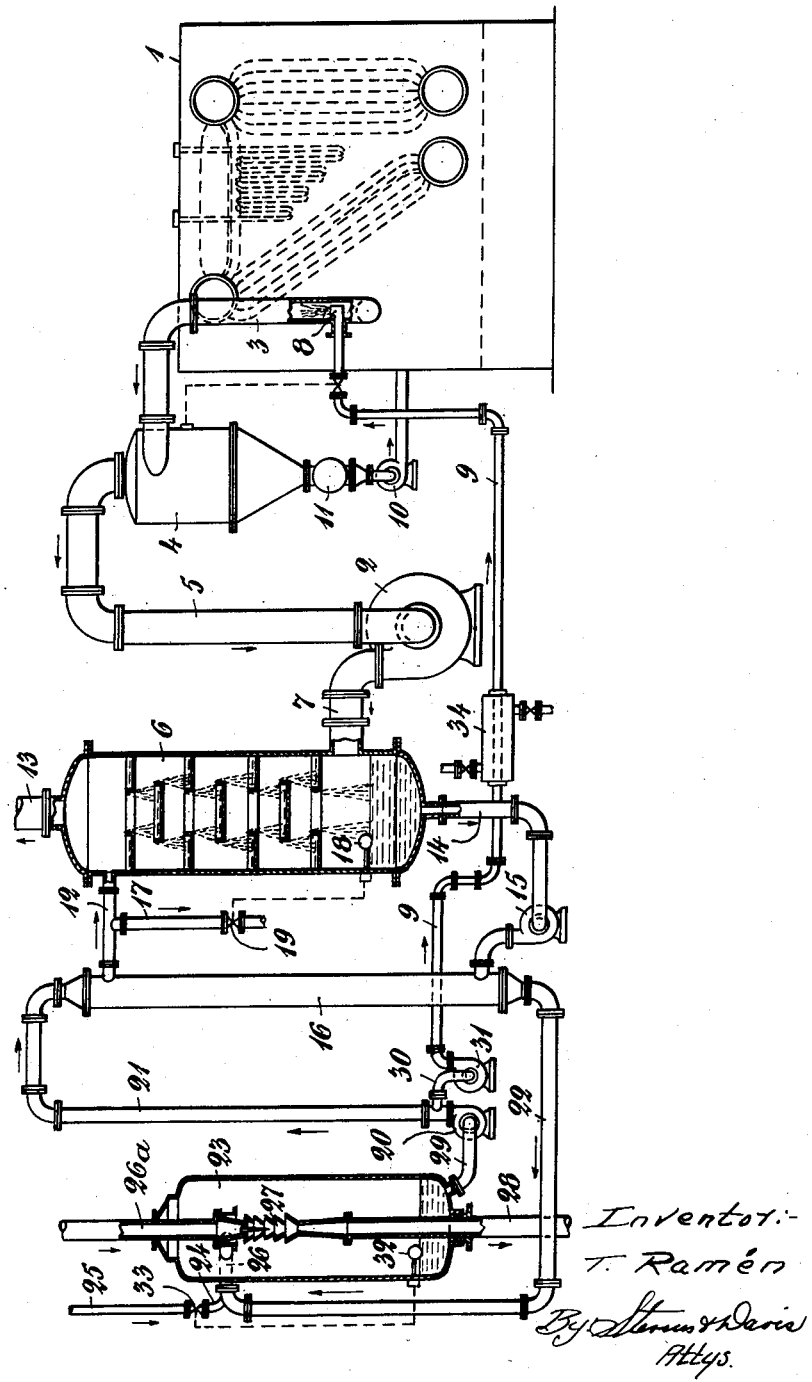

2,343,027

UNITED STATES PATENT OFFICE 2,343,027

PROCESS OF DEHYDRATING WASTE LIQUORS FROM CELLULOSE PRODUCTION

Torsten Ramén, Stockholm, Sweden

Application October 18, 1941, Serial No. 415,652
In Sweden June 6, 1939

6 Claims. (Cl. 159—46)

The present invention relates to a method of dehydrating waste liquors from cellulose pulp production, according to which the waste liquors are first concentrated and then injected into hot gases, such as combustion gases, to be dehydrated into powder form, which powder is subsequently separated from the hot gases in a cyclone separator or the like.

The heat of the combustion gases, which have been somewhat cooled by the injected waste liquors and so contain considerable quantities of steam, has not been heretofore advantageously employed.

According to the present invention the heat of the combustion gases and the latent heat of vaporization of the steam contained therein is employed to heat water by passage in direct heat exchange relationship therewith. The water so heated is used in indirect heat exchange relationship to preheat concentrated waste liquors before passage to the point of injection.

A suitable embodiment of an apparatus for carrying out the process according to the invention is illustrated diagrammatically in the drawing.

In the drawing 1 is a steam boiler. Combustion gases of high temperature are drawn by the fan 2 from the fire place of the steam boiler or other suitable source of hot gases through the pipe 3, the cyclone separator 4 and the pipe 5 and then passed into the scrubber 6 through the pipe 7.

Waste liquors concentrated up to e. g., 20–30% and passing through the pipe 9 are injected in a finely divided state into the pipe 3 through one or several injection nozzles 8. Thereby almost the whole quantity of the water contained in the waste liquors vaporises immediately so that a powder dried, e. g., up to 98% solids content is obtained. Simultaneously the temperature of the combustion gases decreases considerably, and the gases so cooled together with the dry powder are drawn into the cyclone separator 4 or other apparatus in which the dry powder is separated from the gases in a conventional manner. The separated powder is discharged from the cyclone separator by means of a lock 11 and drawn by the fan 10 to be burned in the steam boiler or otherwise used.

The combustion gases passed by the fan 2 into the scrubber 6 contain water (in the form of steam) driven out from the waste liquors, but are not saturated with steam. According to the invention cooling water passes through the pipe 12 into the upper part of the scrubber 6 in which the water trickles down from stage to stage (see the drawing) and meets the combustion gases flowing through the pipe 7 which rise in the scrubber and leave it through the pipe 13 after being cooled below the temperature of condensation.

In this manner the combustion gases are cooled down in the first place to the saturation temperature so that the steam contained in the combustion gases condenses whereby the heat of the combustion gases, the liberated latent heat of vaporization, and the heat of liquid are absorbed by the cooling water and the water of condensation. Then the combustion gases are cooled down to a temperature corresponding nearly to that of the cooling water flowing into the scrubber.

The heated cooling water flowing off from the lower part of the scrubber through the pipe 14 and the water of condensation are forced by the pump 15 into a heat exchange apparatus 16 to which the cooling water delivers the heat. The cooled water flows again into the upper part of the scrubber through the pipe 12. For maintaining substantially constant the quantity of circulating water in this circuit a quantity of water corresponding to the quantity of the water of condensation formed in the scrubber is removed. A substantially constant quantity of water may be maintained in the lower part of the scrubber by means of a float 18 which is connected in any known manner with a valve 19 in the pipe 17 controlling the quantity of water flowing through the pipe 17.

The partially concentrated waste liquors and the heated water coming from the scrubber flow in countercurrent heat exchange relation through the heat exchange apparatus 16 into which the waste liquors in a cold state are forced by the pump 20 through the pipe 21.

The waste liquors heated in the heat exchange apparatus 16 flow then through the pipe 22 into an expansion type vacuum condenser 23. A pipe 25 through which the diluted waste liquors coming from the cellulose cookers pass in a warm state, is connected at 24 with the pipe 22 so that the heated waste liquors mixed together at 24 flow through the pipe 26 into the condenser 23 in which a high vacuum is maintained in such a manner that cooling water flows through the nozzles 27 of the pipe 26a. By this means a part of the liquid contained in the heated waste liquors coming through the pipe 26 is vaporised, and as these waste liquors deliver the heat of evaporation they are cooled down. The quantity of heat that is required for the evaporation is delivered by the diluted waste liquors both coming from the heat exchange apparatus 16 and flowing through the pipe 25. The steam formed in this manner and the cooling water flow off through the pipe 28, and partially concentrated waste liquors are collected in the lower part of the condenser (see the drawing), from which they are drawn through the pipe 29 and pumped again into the heat exchange apparatus 16 through the pipe 21. A quantity of partially concentrated waste liquors is, however, drawn previously by the pump 31 from the pipe 21 through the pipe 30 and forced through the pipe 9 into the nozzle 8.

For maintaining a state of equilibrium in the circulating system formed by the pipes 21, 22, the vacuum condenser 23 and the heat exchange apparatus 16, it is necessary that the quantity of dry powder contained in the waste liquors and drawn through the pipe 30 in the unit of time correspond to the quantity of dry powder contained in the waste liquors flowing through the pipe 25 in the same time. It is possible to regulate this quantity by means of a float 32 which is connected with a valve 33 of the pipe 25 in such a manner that an unchanged level of liquid is maintained in the condenser.

Before the waste liquors withdrawn from the circuit by the pump 31 are injected into the hot gases flowing in pipe 3, they may be advantageously preheated to a suitable temperature by passing them through a preheater 34 to which heat is supplied from a suitable source of heat, such as steam or hot gases. By thus preheating the waste liquors, the water contained therein vaporises immediately when they are injected into the hot gases in pipe 3.

For instance, and merely by way of illustration, the following values are given for the process according to the invention:

The temperature of the gases when they are introduced into the pipe 3=1150° C.; and the temperature of the gases after the evaporation of the partially concentrated waste liquors, i. e., when they are introduced into the scrubber= 150° C.

The waste liquors concentrated to 27.3% solids content in the condenser 23 and preheated to 100° C. in the preheater 34 are injected through the pipe 9 into the hot gases flowing in pipe 3. Therefore the waste liquors circulating through the pipes 21, 22 and the heat exchange apparatus is also concentrated to 27.3%. Diluted waste liquors concentrated to 14.2% and having a temperature of 95° C. flow through the pipe 25. The pressure in the condenser 23 is 0.08 at abs., and the temperature is 35° C. Therefore the waste liquors coming through the pipe 21 into the heat exchange apparatus 16 have a temperature of 35° C., and they are preheated to 65° C. in the heat exchange apparatus. The water flowing from the scrubber into the heat exchange apparatus has a temperature of 75° C., and the water flowing off from the heat exchange apparatus has a temperature of 45° C. The combustion gases coming from the scrubber have a temperature of 50° C. The spent combustion gases entering the scrubber have a saturation temperature of about 82° C. at atmospheric pressure.

Having now particularly described the nature of my invention and the manner of its operation what I claim is:

1. A process of dehydrating waste liquors from cellulose pulp production which comprises, injecting partially concentrated liquors into hot gases in a finely divided state such that they are dehydrated by means of said gases to a dry powder, separating said powder from said gases, passing said gases in direct heat exchange relationship with cooling water so that the steam contained in said gases condenses, the heat of evaporation is liberated thereby and the heat of said gases is absorbed by said cooling water, continuously circulating waste liquor in a circuit, passing said water, after heat exchange contact with said gases, in indirect heat exchange relationship with a portion of the liquor in said circuit, continuously vacuum concentrating the liquor at one zone of said circuit, adding a dilute waste liquor to said circuit at a point ahead of said zone of concentration, and withdrawing liquor from said circuit at a point on the other side of said zone of concentration for injection into said hot gases.

2. A process of dehydrating waste liquors from cellulose pulp production which comprises, injecting partially concentrated liquors into hot gases in a finely divided state such that they are dehydrated by means of said gases to a dry powder, separating said powder from said gases, passing said gases in direct heat exchange relationship with cooling water so that the steam contained in said gases condenses, the heat of evaporation is liberated thereby and the heat of said gases is absorbed by said cooling water, continuously circulating waste liquor in a circuit, passing said water, after heat exchange contact with said gases, in indirect heat exchange relationship with a portion of the liquor in the circuit, said circuit including a vacuum zone for the evaporation of a portion of the waste liquor to concentrate the remainder, adding a dilute waste liquor to said circuit at a point ahead of said vacuum zone, and withdrawing liquor from said circuit at a point on the other side of said vacuum zone for injection into said hot gases.

3. A process of dehydrating waste liquors from cellulose pulp production which comprises, injecting partially concentrated liquors into hot gases in a finely divided state such that they are dehydrated by means of said gases to a dry powder, separating said powder from said gases, circulating water in a circuit, passing said gases through a portion of the water circuit in direct heat exchange relationship with the water so that the steam contained in said gases condenses, the heat of evaporation is liberated thereby and the heat of said gases is absorbed by said water, continuously circulating waste liquor in a circuit, passing said water, after heat exchange contact with said gases and before return to contact them again, in countercurrent indirect heat exchange relationship with a portion of the liquor in its circuit, said liquor circuit including a vacuum zone for the evaporation of a portion of the waste liquor to concentrate the remainder, adding a dilute waste liquor to said liquor circuit at a point ahead of said vacuum zone, and withdrawing liquor from said liquor circuit at a point on the other side of said vacuum zone for injection into said hot gases.

4. A process as claimed in claim 2 which includes the further step of pre-heating the liquor withdrawn from said circuit for injection into said hot gases.

5. A process of dehydrating waste liquors from cellulose pulp production which comprises, injecting partially concentrated liquors into hot gases in a finely divided state such that they are dehydrated by means of said gases to a dry powder, separating said powder from said gases, passing said gases in direct heat exchange relationship countercurrent to cooling water so that the steam contained in said gases condenses, the heat of evaporation is liberated thereby and the heat of said gases is absorbed by said countercurrent cooling water, transferring by indirect heat exchange the heat of the heated cooling water to waste liquors flowing countercurrently thereto in a heat exchange zone and circulating through said heat exchange zone and a vacuum concentrating zone, feeding diluted waste liquors into and withdrawing partially concentrated waste liquors from said vacuum concentrating zone, and adjusting the respective rates of feed and withdrawal such that a state of equilibrium is established in the waste liquor circulation system with respect to the solids content of said waste liquor.

6. The process as claimed in claim 5, wherein the concentrating zone is maintained under a vacuum obtained by passing a confined stream of water through a zone of reduced cross-sectional area communicating with said concentrating zone, thereby creating an ejector effect.

TORSTEN RAMÉN.